J. L. CHESNUTT.
COMBINATION ROLLER AND BALL BEARING WHEEL.
APPLICATION FILED MAY 22, 1919.
1,386,160.
Patented Aug. 2, 1921.
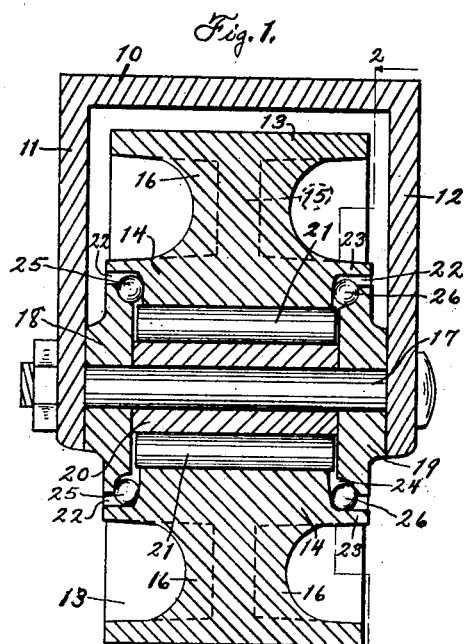
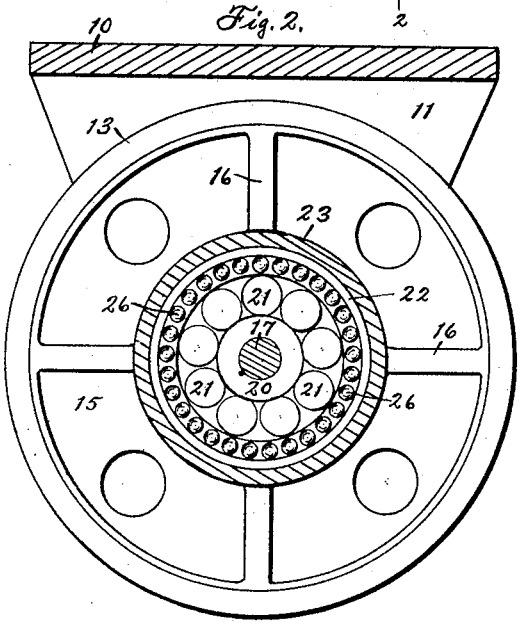
INVENTOR:
J. L. CHESNUTT
By
Earl M. Sinclair
Atty.

UNITED STATES PATENT OFFICE.

JOHN LOUCIEN CHESNUTT, OF KANSAS CITY, MISSOURI, ASSIGNOR TO THE SERVICE CASTER & TRUCK COMPANY, OF KANSAS CITY, MISSOURI, A CORPORATION OF MISSOURI.

COMBINATION ROLLER AND BALL-BEARING WHEEL.

1,386,160.  Specification of Letters Patent.  Patented Aug. 2, 1921.

Application filed May 22, 1919. Serial No. 298,912.

*To all whom it may concern:*

Be it known that I, JOHN LOUCIEN CHESNUTT, a citizen of the United States of America, and resident of Kansas City, Jackson county, Missouri, have invented a new and useful Combination Roller and Ball-Bearing Wheel, of which the following is a specification.

The object of this invention is to provide an improved construction for an anti-friction wheel adapted for use in stationary and swivel casters as well as for other purposes.

A further object of this invention is to provide an improved construction for a wheel having a set of roller bearings arranged between hub and axle to support and receive vertical pressure and also sets of ball bearings to receive lateral pressure or side thrust, said ball bearings receiving none of the vertical pressure.

A further object of this invention is to provide improved means for rigidly securing together the relatively immobile parts of the device to provide a construction of maximum strength.

A further object of the invention is to provide a device of the class described which renders it impossible for strings or similar objects to become wedged between the relatively movable parts and thus impair efficiency of the device.

With these and other objects in view, my invention consists in the construction, arrangement and combination of elements hereinafter set forth, pointed out in my claims and illustrated by the accompanying drawing, in which—

Figure 1 is a vertical cross-section of a device illustrating my invention. Fig. 2 is a vertical section at right angles to Fig. 1, taken substantially on the line 2—2 thereof.

As a support for my improved wheel any suitable type of yoke, bracket or other supporting device may be employed. In the accompanying drawings I have illustrated a yoke having a top plate 10 adapted to be secured to a load object, and integral, parallel, spaced depending flanges or wings 11, 12 between which the wheel is mounted for rotation. The wheel comprises a rim 13 and hub 14 connected by a web 15 and suitable reinforcing flanges or ribs 16. It will be noted the rim and hub of the wheel are relatively broad, and the hub is formed with a relatively large bore. An axle 17 is mounted transversely and passes through registering holes in the flanges 11, 12, and said axle may be headed at one end and threaded at the opposite end to receive a nut; or may be riveted at its ends against the outer faces of said flanges. Washers 18, 19 are mounted on opposite end portions of the axle 17, in contact with the inner faces of the flanges 11, 12, said washers being relatively thick and preferably being formed with reduced bosses on their outer faces merging into the bodies thereof on curved lines. A sleeve or bushing 20 is mounted on the axle 17 between the washers 18, 19, said sleeve having its outer periphery spaced materially from the inner periphery of the hub 14 of the wheel, and a series of anti-friction devices, such as rollers 21, are mounted between said members. The rollers 21 are somewhat shorter than the sleeve 20, so that they cannot contact both of the washers 18, 19, simultaneously, whereby end thrust and friction on said rollers is avoided. The sleeve 20 and washers 18, 19 snugly fill the space between the flanges 11, 12, and said members are tightly drawn together and held by the securing means on the ends of the axle 17, whereby an exceedingly rigid structure is obtained. At each end the wheel hub 14 is formed with a circumferential groove or rabbet 22 communicating with the adjacent end of the bore of said hub, and within said grooves or rabbets the washers 18, 19 are partially received, loosely. In this manner peripheral flanges 23 are formed on outer circumferential portions of the ends of the hub 14, which project over and are spaced from the bodies of the washers 18, 19. On their inner faces the washers 18, 19 are formed with peripheral grooves 24 constituting raceways, and in said grooves, and between the washers and the adjacent ends of the hub 14, are placed series of bearing balls 25, 26, said balls contacting on their lateral sides the hub and washers and providing anti-friction devices and bearings between said members in lateral directions. The rabbets 22 of the hub are of sufficient circumference that the balls 25, 26 do not contact the inner faces of the flanges 23 and the washers 18 or 19 simultaneously, as clearly shown in Fig. 1, so that said balls do not receive any vertical pressure and do not bear any of the load. It is the function of the balls 25, 26 to receive lateral or side thrust only and to diminish friction between the wheel and relatively immobile members whenever the load is on an incline which would cause an undue portion of the weight to be thrown against one side of the hub, or whenever the load object is rounding a corner. It is the function of the anti-friction rollers 21 to bear all of the pressure between the hub and axle devices caused by the downward pressure of the load, and to reduce the friction between said parts, and as said rollers are somewhat shorter than the sleeve 20 there is no lateral pressure on them. Any suitable style and construction of anti-friction rollers may be employed.

As the balls 25, 26 are subject to lateral pressure only they are caused to turn only on vertical axes, thus reducing wear on the balls and other parts and also reducing the amount of friction and inducing the load to draw much more easily than in ordinary constructions.

The flanges 23 of the hub 14 overhang the bearing balls, raceways and bearing washers 18, 19 and prevent the entrance of foreign substances.

This construction also prevents strings and like objects being drawn between the hub and fork and wrapped around the axle, which tendency is a source of much trouble in ordinary caster wheels, often becoming so tightly wedged that the wheel cannot revolve. In my construction, when a string catches on the wheel rim it is drawn over the hub as the wheel revolves and slides off the hub over the flange 23 at one side or the other, down to the reduced portion of the adjacent washer 18 or 19, then slides off the lower end of the adjacent flange 11 or 12 of the yoke, which preferably terminates flush with the lower side of the washer and on a continuation of the curve of the reduced portion thereof. Then the string may work up to a position around the flange 11 or 12 above the adjacent washer, where it will not interfere seriously with the operation of the wheel, and may be cut away conveniently on occasion. When a round-head bolt or rivet is employed for the axle this movement of the string is more marked.

A wheel constructed after this fashion may be used to advantage in a caster of either swivel or rigid type, or for other uses where a particularly smooth-running wheel is desired.

I claim as my invention—

1. A device of the class described, comprising a support having spaced flange members, an axle carried by said flange members, a wheel mounted concentrically on said axle between said flange members, said wheel having a hub formed with a relatively large bore, washers on said axle in contact with the inner faces of said flange members, a sleeve on said axle between said washers, roller bearings between said sleeve and the wheel hub adapted to receive vertical pressure of a load on said support, said rollers being of slightly less length than said sleeve, and securing means on end portions of said axle outside of said flange members whereby said flange members, washers and sleeve may be drawn together and form a rigid structure, said washers being out of direct contact with the hub of said wheel.

2. A device of the class described, comprising a support having spaced flange members, an axle carried by said flange members, a wheel mounted between said flange members concentrically of said axle, said wheel having a hub formed with a relatively large bore, a sleeve on the central portion of said axle, washers on end portions of said axle, rollers between said sleeve and the wheel hub, said washers having their body portions of considerably greater diameter than said sleeve, said hub being formed at its ends with rabbets within which body portions of said washers project, bearing balls between said washers and the hub, said washers being formed on their outer faces with bosses reduced in diameter and in contact with inner faces of said flange members, said flange members terminating flush with the lower sides of said bosses.

Signed at Kansas City, in the county of Jackson and State of Missouri, this 21st day of April, 1919.

JOHN LOUCIEN CHESNUTT.